(No Model.)
W. P. TRACY.
THILL COUPLING.
No. 354,753. Patented Dec. 21, 1886.
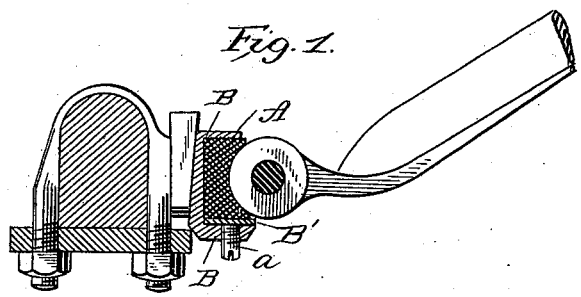
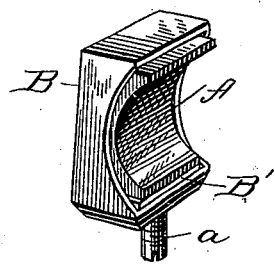
Attest:
Walter Donaldson
Chas. L. Sturtevant,
Inventor
Wm P. Tracy
by Ellis Spear
Atty.

UNITED STATES PATENT OFFICE.

WILLIAM P. TRACY, OF GRAND RAPIDS, MICHIGAN.

THILL-COUPLING.

SPECIFICATION forming part of Letters Patent No. 354,753, dated December 21, 1886.

Application filed October 12, 1886. Serial No. 216,049. (No model.)

*To all whom it may concern:*

Be it known that I, WILLIAM P. TRACY, of Grand Rapids, in the county of Kent and State of Michigan, have invented a new and useful Improvement in Thill-Couplings; and I do hereby declare that the following is a full, clear, and exact description of the same.

My invention relates to anti-rattlers for thill-couplings, and particularly to that class in which a rubber bushing is used, combined with means to adjust it in relation to the thill. Heretofore bushings of this character have been held in various ways, and innumerable means for adjustment have been provided.

It is the object of my invention to provide a coupling which shall hold the bushing upon all sides, preventing spreading thereof, so that the pressure may be equally applied at all points.

Another object is to provide a simple means of adjustment of the bushing in relation to the thill, and an independent means of adjustment by which the pressure of the bushing against the thill may be increased independent of the main adjustment.

The invention consists of a yielding bushing inclosed within a case at the top, bottom, and sides and back, adapted to be adjusted by means of a wedge inserted between the casing and the shackle.

It further consists, in connection with the above, of an adjusting means carried by the inclosing-case of the coupling.

In the drawings, Figure 1 represents a side elevation of a shackle and thill, partly in section, with my improvement attached. Fig. 2 is a detail view of the parts of my coupling.

In the drawings, the bushing is shown at A, which is of rubber or any flexible material, and the case inclosing the same is shown at B. The walls of this case protect the rubber upon the top, bottom, sides, and back, thus preventing it from spreading when the pressure is applied, this being a great defect in a majority of couplings of this class. The coupling is placed in position with its cut-out portion bearing against the thill, and it is held in the proper relation, fitting snugly against the thill, by means of a wedge driven in at the rear between it and the shackle. It will thus be seen that, instead of the adjustment coming upon the rubber itself or upon an interposed plate, which would cause the rubber to spread upon all sides, the adjustment is applied to a moving casing, which securely holds the rubber and protects it at every point.

To provide means whereby the rubber may be forced snugly against the lower sides of the thill, in case such adjustment is necessary independent of the horizontal adjustment by means of the wedge, I have arranged a set-screw, $a$, in the under side of the casing B, and a follower-plate, B′, within the casing adapted to receive the pressure of the screw and to force the lower projecting end of the bushing snugly against the thill.

I am aware that a case covering the packing at its top, bottom, and rear is not new, the packing being compressed by a follower and set-screw beneath the same, and I do not broadly claim this.

I claim—

1. A thill-coupling anti-rattler consisting of a movable casing, a rubber bushing carried thereby, and inclosed upon the top, bottom, sides, and back, in combination with an independent wedge for forcing the same against the thill, substantially as described.

2. A thill-coupling consisting of a movable case containing a flexible bushing, an independent wedge adapted to adjust the same horizontally, and an adjusting-screw and plate carried by the moving case, substantially as described.

In testimony whereof I have signed my name to this specification in the presence of two subscribing witnesses.

WM. P. TRACY.

Witnesses:
WM. H. SHELLER,
D. E. VAN DER VEEN.